April 26, 1927.  S. I. PRESCOTT ET AL  1,626,355
WHEEL
Filed Nov. 16, 1921
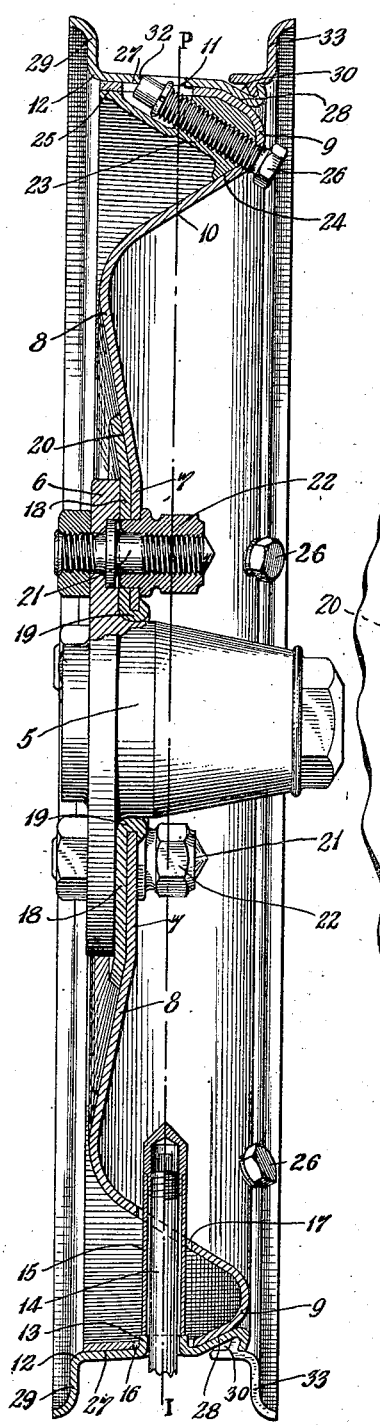
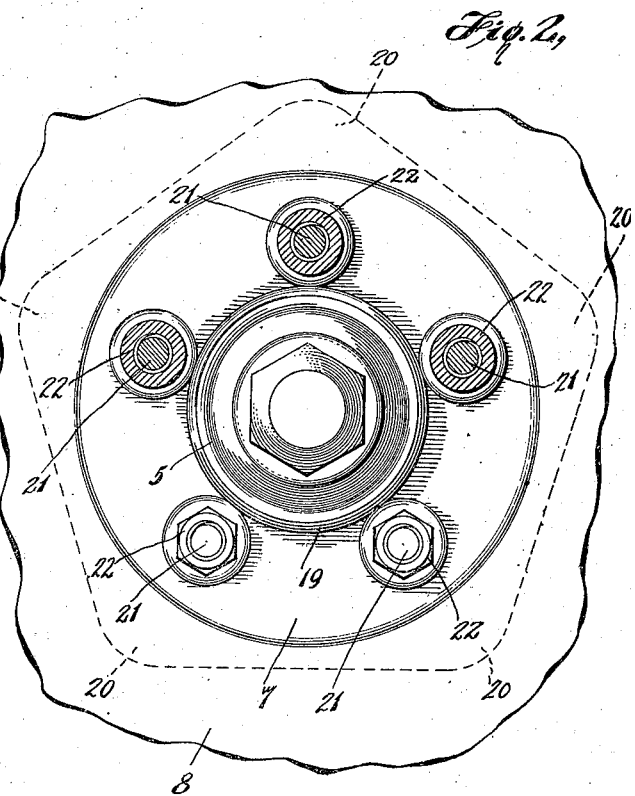
INVENTORS
Sydney I. Prescott
Francis J. Rummler
BY Sydney I. Prescott
ATTORNEY Patented Apr. 26, 1927.

1,626,355

UNITED STATES PATENT OFFICE.

SYDNEY I. PRESCOTT, OF NEW YORK, N. Y., AND FRANCIS J. RUMMLER, OF LYNDHURST, NEW JERSEY.

WHEEL.

Application filed November 16, 1921. Serial No. 515,465.

This invention relates to an improvement in wheels, particularly to pressed steel wheels of the disc type.

In our co-pending application, Serial No. 344,282, filed December 12, 1919, there is disclosed a standardized or universal wheel in the use of which a tire may be changed alone, or with its rim as a unit, or with its rim and the wheel body as a unit, and which eliminates the necessity heretofore existing for the manufacture of numerous sizes of three distinct types of wheels, and possesses numerous other advantages peculiar to itself. The main object of the present invention is the production of an improved wheel of this standardized or universal type, possessing the further advantages of fewer parts, increased lightness, particularly rim-lightness, increased resiliency, increased accessibility, faster and easier rim operation, better vibration control, and lower cost. With this and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Fig. 1 is a cross sectional view of a wheel constructed in accordance with the invention; and Fig. 2 is a fragmentary detail side view showing one of the vibration control devices shown in Fig. 1.

Referring to the drawings, which illustrate but one of many possible concrete embodiments of the invention, 5 indicates a hub provided with a disc mounting flange 6 the outer face of which lies behind the plane of impact indicated by the line P—I in Fig. 1. The purpose of so locating the hub flange is to give the wheel as a whole a "dish" of approximately two degrees whereby it is strengthened against lateral stresses developed in road use.

Mounted on the hub 5 is a disc which, as shown, has a central flat mounting section 7 curved into a retreating, conical mid-section 8, both being behind the plane of impact. The mid-section curves into a concavo-convex rim section which crosses the plane of impact at 10 and recrosses the same at 11, the distance between the points 10 and 11 being short enough to permit a tire valve stem and its cover to project through the rim section and be accessible from the front of the wheel. How this is done will be readily understood by an inspection of Fig. 1 in which 12 indicates generally a quick-detachable and demountable rim provided with a short and hollow rim driving lug 13 through which passes a valve stem 14 carrying its cover 15, the rim section 9 being provided with a rim driving aperture 16 and with a valve stem aperture 17, both large enough to permit rim mounting and demounting without disturbing the cover 15.

The disc is shaped as above described in order to make the wheel resilient and easy riding. This shape, however, by permitting disc yield in some degree, invites excessive vibration. To prevent the development of this excessive vibration and its attendant evils, there is provided means united with the disc and acting to control its vibration. This vibration controlling means is in two parts acting, respectively, at the inner and outer peripheries of the disc, to establish an odd number of nodal lines and thus divide the disc into an odd number of areas incompatible with vibration wave propagation.

With this end in view, there is provided an annular plate 18 lying between the mounting section 7 and the hub flange 6 and projecting beyond the latter. Opposite the hub flange, this plate is flat, but beyond the same it conforms to the shape of the mid-section 8. The inner periphery of the plate 18 is swaged to the disc at 19, and its outer periphery is of pentagonal form, with rounded corners, and is thus provided with an odd number of radial salients 20 which are spot welded to the mid-section 8 of the disc. By means of the structure just described, the disc is stiffened at five points adjacent the inner periphery of the mid-section 8, and this results in establishing five nodal lines in the disc which radiate from its centre and pass through the salients. To augment this nodal stiffening of the united plate and disc, there is employed means acting to subject the united plate and disc to considerable pressure, and, as shown, this means consists in a series of disc mounting bolts 21 and nuts 22 equal in number to the plate salients and radially arranged with respect thereto, or, in other words, on the five nodal lines established by the peculiar shape and union of the plate and disc.

There is further provided an odd number of vibration dampers united with the disc adjacent its outer periphery, and, as shown, these dampers, marked 23, are located in the concavity of the rim section 9 and are united therewith by spot welding at 24 and 25. By means of these dampers, the rim section 9 is stiffened in an odd number of positions, and nodal lines are thereby established which may be coincident with the nodal lines established by the union of the pentagonal plate 18 and the disc. To augment the nodal stiffening effect of the united dampers and rim section, devices acting to subject the united structure to considerable pressure are employed, and, as shown, consist in rim holding thrust screws 26 threaded in the dampers 23 acting also as rim holding nuts and distortion preventives.

For the purpose of providing extreme rim-lightness, and thus avoid retardation in acceleration and "fly wheel effect" in stopping, an especially co-ordinated rim section and rim is employed. The rim section 9 is provided with a broad rim seat in part tapered slightly within a radius equal to the greatest diameter of the rim seat and in part tapered in greater degree. As shown, this broad rim seat presents a wide conical surface 27 which curves into another conical surface 28, the latter being substantially parallel with the axes of the rim holding thrust screws 26. The conical surface 27 is within a radius equal to the greatest diameter of the rim seat, this being necessary to permit mounting and demounting of the rim. The two conical surfaces are desirable because of the necessity of permitting diametral tolerances of .05" in manufacture, the greater angular surface serving to prevent a slightly undersized rim from becoming wedged on its seat too tight for easy removal.

Mounted on this rim seat is a demountable and quick-detachable rim comprising an endless sheet metal ring shaped to form a fixed tire flange 29, a retaining channel 30, and an intermediate main section 31 having a broad or wide bearing surface corresponding in form to the rim seat of the wheel body. The main section of this rim is provided with a series of indented or interior abutments 32 against which the rim holidng thrust screws 26 bear in holding the rim on the seat. And seated in the channel 30 is a split quick-detachable tire flange 33.

In the structure above described, the rim section is permitted to yield enough under road shock to give the wheel the resiliency desired for easy riding; but its tendency to develop periodic and excessive vibration is counteracted by the vibration controlling means acting to limit yielding movements to single vibrations. The extremely large bearing surface of the rim permits the use of a smaller number of rim holding devices and vibration dampers; the particular form of rim seat and rim results in a material saving in weight at the rim, and further permits the use of smaller vibration dampers and rim holding devices, all of which reduces initial and maintenance cost.

Changes and variations within the scope of the claims may be made in the structure by means of which the invention is carried into effect. The invention, therefore, is not to be restricted to the precise details of the structure shown and described.

What is claimed is:

1. A wheel comprising a motor-vibrated hub, a road-vibrated rim, and a vibration-damping body on said hub and supporting said rim, said body including a disc, and an annular plate having an odd number of radial salients and united with said disc.

2. A wheel comprising a motor-vibrated hub, a road-vibrated rim, and a vibration-damping body on said hub and supporting said rim, said body including a disc, and an annular plate having a pentagonal outer perimeter and united with said disc.

3. A wheel comprising a motor-vibrated hub, a road-vibrated rim, and a vibration-damping body on said hub and supporting said rim, said body including a disc, and an annular plate having a pentagonal outer perimeter and united with the central part of said disc.

4. A wheel comprising a motor-vibrated hub, a road-vibrated rim, and a vibration-damping body on said hub and supporting said rim, said body including a disc, and an annular plate having an inner perimeter swaged to said disc and an outer perimeter provided with an odd number of radial salients spot welded to said disc.

5. A wheel comprising a motor-vibrated hub, a road-vibrated rim, and a vibration-damping body on said hub and supporting said rim, said body including a disc, an annular plate having an odd number of radial salients and united with said disc, and means acting to subject the united plate and disc to pressure.

6. A wheel comprising a motor-vibrated hub, a road-vibrated rim, and a vibration-damping body on said hub and supporting said rim, said body including a disc, an annular plate having an odd number of radial salients and united with said disc, and a series of body mounting bolts equal in number to said salients and acting to subject the united plate and disc to pressure.

7. A wheel comprising a motor-vibrated hub, a road-vibrated rim, and a vibration-damping body on said hub and supporting said rim, said body including a disc, and an annular plate having an odd number of radial salients and united with the central part of said disc, and an odd number of vibration dampers united with the outer part of said disc.

8. A wheel comprising a motor-vibrated hub, a road-vibrated rim, and a vibration-damping body on said hub and supporting said rim, said body including a disc having a flat central mounting section and a non-flat mid-section, and an annular plate having an inner perimeter swaged to said mounting section and having an outer perimeter provided with an odd number of radial salients spot welded to said mid-section.

9. A wheel comprising a motor-vibrated hub, a road-vibrated rim, and a vibration-damping body on said hub and supporting said rim, said body including a disc having a flat central mounting section and a non-flat mid-section, and an annular plate having a flat central section united with said mounting section and having a non-flat pentagonal part united with said mid-section.

10. A wheel comprising a motor-vibrated hub, a road-vibrated rim, and a vibration-damping body on said hub and supporting said rim, said body including a disc having a central mounting section and a mid-section both behind the plane of impact and having a concavo-convex rim section crossing and recrossing said plane, and an odd number of vibration dampers in the concavity of and united with said rim section.

11. A wheel comprising a motor-vibrated hub, a road-vibrated rim, and a vibration-damping body on said hub and supporting said rim, said body including a disc having a central mounting section and a mid-section both behind the plane of impact and having a concavo-convex rim section crossing and recrossing said plane, an odd number of vibration dampers in the concavity of and united with said rim section, and means acting to subject the united dampers and rim section to pressure.

12. A wheel comprising a motor-vibrated hub, a road-vibrated rim, and a vibration-damping body on said hub and supporting said rim, said body including a disc having a central mounting section and a mid-section both behind the plane of impact and having a concavo-convex rim section crossing and recrossing said plane, an odd number of rim holding and vibration-damping nuts in the concavity of and united with said rim section, and a corresponding number of rim holding thrust screws working in said nuts and acting to subject the united nuts and rim section to pressure.

13. A wheel comprising a motor-vibrated hub, a road-vibrated rim, and a vibration-damping body on said hub and supporting said rim, said body including a disc having a central mounting section and a mid-section both behind the plane of impact and having a concavo-convex rim section crossing and recrossing said plane.

14. A wheel comprising a motor-vibrated hub, a road-vibrated rim, and a vibration-damping body on said hub and supporting said rim, said body having a broad rim seat in part tapered slightly within a radius equal to the greatest diameter of said seat and in part tapered in greater degree, and said rim having a broad bearing surface corresponding in form to said seat.

15. A wheel comprising a motor-vibrated hub, a road-vibrated rim, and a vibration-damping body on said hub and supporting said rim, said body having a broad rim seat in part tapered slightly and in part tapered in greater degree, said rim having a broad bearing surface corresponding in form with said seat and being provided with a series of indented abutments, and means carried by said body and engaging said abutments for holding said rim on said seat.

16. A wheel comprising a motor-vibrated hub, a road-vibrated rim, and a vibration-damping body on said hub and supporting said rim, said body including a disc having a flat central mounting section curved into a retreating conical mid-section both behind the plane of impact, said mid-section being curved into a concavo-convex rim section crossing and recrossing said plane.

17. A wheel comprising a motor-vibrated hub, a road-vibrated rim, and a vibration-damping body on said hub and supporting said rim, said body including a flat central mounting section curved into a retreating conical mid-section both behind the plane of impact, said mid-section being curved into a concavo-convex rim section crossing and recrossing said plane and having a broad rim seat in part tapered slightly and in part tapered in greater degree, said rim having a broad bearing surface corresponding with said seat and being provided with a series of indented abutments, and means carried by said disc and engaging said abutments for holding said rim on said seat.

18. A wheel comprising a motor-vibrated hub, a road-vibrated rim, and a vibration-damping body on said hub and supporting said rim, said body having a broad rim seat in part tapered slightly within a radius equal to the greatest diameter of said seat and in part tapered in greater degree.

19. A wheel comprising a motor-vibrated hub, a road-vibrated rim, and a vibration-damping body on said hub and supporting said rim, said body having a broad rim seat presenting a conical surface the taper of which is slightly within a radius equal to the greatest diameter of said seat, said surface curving into another conical surface the taper of which is greater.

20. A wheel comprising a motor-vibrated hub, a road-vibrated rim, and a vibration-damping body on said hub and supporting said rim, said body including a disc having a flat central mounting section curved into a retreating conical mid-section both behind the plane of impact, said mid-section curving into a concavo-convex rim section crossing and recrossing said plane and having a broad rim seat in part tapered slightly within a radius equal to the greatest diameter of said seat and in part in greater degree.

21. A wheel comprising a motor-vibrated hub, a road-vibrated rim, and a vibration-damping body on said hub and supporting said rim, said body having a broad rim seat in part tapered slightly and in part of a different shape to prevent said rim from becoming wedged on said seat too tightly for easy removal.

In testimony whereof, we have signed our names to this specification.

SYDNEY I. PRESCOTT.
FRANCIS J. RUMMLER.